Patented Aug. 8, 1933

1,921,398

UNITED STATES PATENT OFFICE 1,921,398

MANUFACTURE AND SEPARATION OF SULPHUR-CONTAINING PRODUCTS OF THE ACID HYDROLYSIS OF KERATIN AND KERATIN SUBSTANCES

Ernst Sturm, Berlin-Laukwitz, Germany, assignor to the Firm Johann A. Wulfing, Berlin, Germany No Drawing. Application August 7, 1931, Serial No. 555,870, and in Germany August 26, 1930

3 Claims. (Cl. 260—9)

Keratin, the basis of all horny substances, such as wool, hair, feathers, hoofs, nails etc., can be split up both by acid hydrolysis and alkali hydrolysis. The extent to which the splitting up of these substances occurs on hydrolysis of the same depends upon the concentration of the acids and alkalies used and upon the temperature and duration of the reaction. The more concentrated the acids and alkalies, the higher the temperature and the longer the duration of reaction, the deeper seated is the splitting up of the keratin substances. With advancing hydrolysis the products formed become more and more soluble in water and poorer in sulphur.

The splitting products obtained by acid hydrolysis of keratin are not cognate albumen complexes, but contain more or less lower splitting products of the keratin used. When, therefore, cognate albumen products, rich in sulphur and consequently of therapeutical value, are to be produced, not only must acid hydrolysis be broken off at a suitable time, but the products thus obtained must be freed from the low and valueless splitting products which are simultaneously formed. Thus, cognate albumen products containing up to 6% of sulphur, insoluble in water but readily soluble in alkali, can be obtained when keratin substance is treated in the cold or in the hot with more or less concentrated mineral or organic acids until the keratin substance used has lost its natural form and become a gluey mass. When this point has been reached, hydrolysis must be immediately stopped by diluting the reaction mass with water, filtering and neutralizing with alkali. The neutral solution is then saturated with ammonium sulphate or magnesium sulphate, which salts have a salting out effect and thus complete precipitation, and the mixture is allowed to stand until the precipitate has completely separated out. The precipitate is filtered off and boiled with water for some time, as a result of which three different products are obtained, viz., (1) a product which is insoluble in boiling water and can be filtered off from the boiling solution (keratinate), (2) a product which is soluble in boiling water but insoluble in cold water, and therefore separates when the solution filtered from product (1) is cooled down (keratose), and (3) a product which is soluble in boiling as well as in cold water and therefore does not separate out at all from the filtrate on cooling. By this means it is easy to separate the lower splitting products from a mixture of keratinates and keratoses and to purify and separate them from one another. By eliminating the lower splitting products which are poor in sulphur and therefore less valuble for therapeutical purposes than the higher products, such as keratinates and keratoses, the latter become richer in sulphur and non-hygroscopic.

The expression "keratose" is used in this specification, and the claims appended thereto, for a keratin degradation product of albuminous nature in the sense in which the word is used by Barrit ("Journal of the Textile Institute," Manchester, Vol. XVII, No. 3, March 1926) and particularly by Heiduschka ("Zeitschrift für physiologische Chemie", vol. 124, page 39). The word "keratinate" is used in analogy with the word "albuminate". The latter (c. f. Hammarsten, "Lehrbuch der physiologischen Chemie," 11th edtn. 1926, page 97–98) is employed for the first degradation product obtained from albumin by acid hydrolysis which, almost insoluble in water, dissolves readily when a small quantity of alkali is used. Applicant here uses the word keratinate for the analogous product obtained from keratin.

In German Patent No. 437,669 a product of keratin substance, especially of horn, has been described which is split up to only a very slight extent, and is obtained by the action of hydrochloric acid of sp. gr. 1.17–1.2 on horn in the cold until the keratin substance begins to soften. This substance does not comprise cognate albuminous matter, but consists of small quantities of keratinate together with large quantities of non-decomposed keratin substance and impurities from the horn used. The product thus obtained, therefore, is but slightly soluble in dilute alkali and is useless for therapeutical purposes, but, as the inventors themselves state, it is suitable only as food for cattle and for the formation of artificial horn. The manufacturing process as described in the German Patent No. 437,669, on the other hand, is only available for the decomposition of horn, and not for all keratin substances in general, such as wool, hair, feathers etc., as these substances swell up with strong hydrochloric acid to a pasty mass which cannot be washed with water and therefore cannot be freed, as is prescribed, from the strong acid used for splitting up the keratin substance.

In German Patent No. 192,840 a process is described for producing albumoses and peptones of keratin and keratin substances which consists in treating keratin, for instance horn, with sulphuric acid of 50–60% strength for half an hour at a temperature of 60° C. until the horn has been entirely dissolved. Sulphuric acid is removed from the reaction mass, diluted with water, by precipitating it with barium carbonate or hydroxide, the barium sulphate is filtered off and the filtrate is evaporated to dryness in vacuo. The conditions set forth in patent specification No. 192,840, however, are only suitable when horn is used as raw material; other keratin substances, such as wool, hair, feathers, require a treatment with 50–60% sulphuric acid for a much longer time than half an hour and are not dissolved in less than three hours. Moreover, by the German Patent No. 192,840 albumoses and peptones of keratin are produced, while according to the new process, according to this invention, as is stated above, in the main keratinates are to be obtained. The latter cannot be obtained at all by the process of German Patent No. 192,840, as in this process acid hydrolysis is driven forward to such an extent as to produce a clear acid solution of the horn and if small quantities of keratinates should be formed, they would be removed as barium salts with the barium sulphate, since the barium salts of keratinates are insoluble in hot and cold water and do not pass into the filtrate which is to be evaporated to dryness.

The duration of acid hydrolysis in the new process is the shorter the stronger the acid and the higher the temperature of the same. Mineral and organic acids, especially formic acid, are suitable acids. The criterion of the finish of the reaction is the point at which the keratin substance loses its natural form and becomes a gluey mass.

*Example I.*—100 gr. of degreased hair, are heated with 600 ccm. of sulphuric acid of 60% strength at 60° C. the mass being well stirred, until the hair loses its natural form and becomes a gluey mass, which is the case after about 75–90 minutes. The reaction mass is then diluted with 600 ccm. of water, filtered and neutralized in the cold with caustic soda. The neutral solution is saturated with ammonium sulphate or magnesium sulphate. The pricipitate formed is filtered and introduced into boiling water. The insoluble part is filtered off and consists of keratinates. The albuminous matter thus obtained contains, when dried, about 6% of sulphur.

The keratoses separate from the hot filtrate on cooling; these are filtered off and dried. They contain 4% of sulphur.

*Example II.*—100 gr. of wool, degreased and freed from impurities, are mixed with 900 ccm. of sulphuric acid of 40% of strength and heated at about 80° C. while the reaction mass is well stirred until the wool has lost its natural form and become a gluey mass, which takes about 30–35 minutes. The hydrolysate thus obtained is further treated as described in Example I.

The keratinates of wool contain 4.75% of sulphur, and the keratoses 3.64% of sulphur.

*Example III.*—100 gr. of horn, well ground and degreased, are heated up to 60° C. with 400 ccm. of sulphuric acid of 60% of strength and kept at this temperature till the horn becomes a gluey mass. The hydrolysate thus obtained is treated in the same way as described in Example I.

While the keratinates of horn substance contain 2.55% of sulphur, the corresponding keratoses contain 1.08% of sulphur.

*Example IV.*—100 gr. of horn, well ground and degreased, are mixed with 500 ccm. of hydrochloric acid containing 24% HCl and treated at room temperature until the horn has lost its natural form and shows a gluey appearance; this occurs after about 18 hours.

The hydrolysate, thus obtained, is further treated as described in Example I. The keratinates of horn obtained in this way contain 2.8% of sulphur, while the corresponding keratoses contain 1.26% of sulphur.

*Example V.*—100 gr. of horn, well ground and degreased, are boiled under reflux for about 10 hours with 1000 ccm. of 60% formic acid until the horn has lost its natural form and become a gluey mass. The hydrolysate produced in this way is further treated as described in Example I.

The keratinates thus obtained contain 3.82% of sulphur, and the keratoses contain 1.99% of sulphur.

What I claim is:

1. A method of manufacturing and separating sulphur-containing products of the acid hydrolysis of substances comprised of keratin, comprising the steps of treating said substances with acid, stopping the treatment at that point at which the keratin substances just lose their natural form and turn into a gluey mass, diluting the reaction mass with water, neutralizing it with a substance having an alkaline reaction, completing the precipitation which occurs by saturating the solution with a water-soluble sulphate having a salting-out effect, filtering off the precipitate and boiling it with water, filtering off and drying the part remaining undissolved, comprised of keratinates, cooling the hot filtrate in order to deposit the keratoses, and removing the resulting deposit containing the keratoses from the liquor, which contains the lower splitting products.

2. As chemical compounds, keratinates in the form of brown powders containing 2.5–6% of sulphur, nonhygroscopic and without smell, substantially as set forth.

3. As chemical compounds, keratoses in the form of yellow powders containing 1–4% of sulphur, nonhygroscopic and without smell, substantially as set forth.

ERNST STURM.